United States Patent [19]
Hibino

[11] 3,960,026
[45] June 1, 1976

[54] TIMING CHAIN TENSIONER
[75] Inventor: Masaru Hibino, Toyota, Japan
[73] Assignee: Toyota Jidosha Kogyo Kabushiki Kaisha, Toyota, Japan
[22] Filed: Jan. 9, 1975
[21] Appl. No.: 539,788

[30] Foreign Application Priority Data
Jan. 25, 1974    Japan.............................. 49-10908

[52] U.S. Cl. ......................................... 74/242.11 S
[51] Int. Cl.² ........................................... F16H 7/12
[58] Field of Search............... 74/242.11 S, 242.11 R

[56] References Cited
UNITED STATES PATENTS
3,626,776  12/1971  Staudinger et al............ 74/242.11 S
FOREIGN PATENTS OR APPLICATIONS
1,450,801  9/1969  Germany..................... 74/242.11 S
1,650,917  12/1970  Germany..................... 74/242.11 S
570,993  12/1957  Italy.............................. 74/242.11 S Primary Examiner—Leonard H. Gerin
Attorney, Agent, or Firm—Spensley, Horn & Lubitz

[57]  ABSTRACT

A timing chain tensioner comprising a housing adapted to be mounted on an engine block and formed with cylinder bore and connecting passage for the escape of air from the cylinder bore to the atmosphere, a plunger slidably fitted in the cylinder, and a closure member for closing the passage. When the plunger is to be placed into the cylinder for the assembling of the tensioner the passage is kept open to facilitate the plunger insertion, and after the insertion the passage is closed by the closure member.

3 Claims, 4 Drawing Figures

TIMING CHAIN TENSIONER

BACKGROUND OF THE INVENTION

This invention relates to a timing chain tensioner for use with a timing chain for driving an engine camshaft.

Conventional timing chain tensioners contain a plunger, which engages a timing chain, and a spring for biasing the plunger outward. The conventional timing chain tensioner is not provided with means for temporarily locking the plunger normally urged outward by the spring force, so that it is difficult to wind the timing chain around the sprockets in the course of engine assembling. In the case where a timing chain is set in place with a tensioner having no plunger locking means, the strong tension is applied to the chain by the plunger at all times so that the engaging of the chain with the sprockets and the mounting of the sprockets on the drive and driven shafts are very troublesome.

In an effort to solve the foregoing problems, a timing chain tensioner having means for temporarily locking the plunger has already been proposed. However, the proposal has nevertheless failed to offer a satisfactory solution.

The prior art tensioner still has a drawback in which the plunger cannot be rapidly introduced into the cylinder bore when the assembling of the tensioner is carried out, because the construction does not permit the air to leave the cylinder quickly as the plunger is led into the cylinder bore. The difficulty in the plunger insertion will be more greater when the plunger is inserted into the cylinder bore after the body portion of the tensioner is fixed to the wall of the engine block. After the body portion of the tensioner was mounted on the engine block, the cylinder bore is connected to the pressurized oil passage of engine lubricating system and the air trapped in the cylinder bore does not escape outside of the cylinder bore and further the air is compressed by the pressurized oil in the engine lubricating system, so that such the difficulty will be increased.

SUMMARY OF THE INVENTION

In the timing chain tensioner of the invention, a bore or cylinder formed in the housing into which a plunger is inserted is communicated with the atmosphere via a connecting bore or vent, and the housing is provided with a closure member for the vent. This arrangement enables the plunger, as it enters the cylinder in the course of assembling, to drive the air out of the cylinder bore to the atmosphere.

Therefore, according to the present invention, the difficulties in inserting the plunger into the cylinder bore in the assembling of prior art tensioners due to the inability of venting of the air can be successfully avoided.

DETAILED DESCRIPTION OF THE INVENTION

Figure 1:
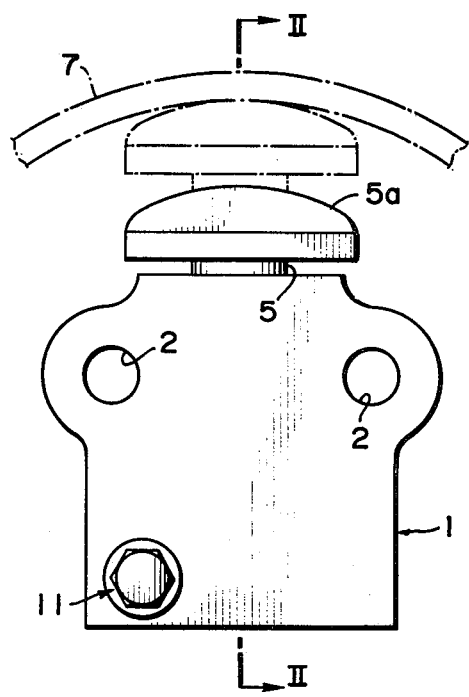
FIG. 1 is a front view of a timing chain tensioner embodying the invention.

In the drawing, the reference numeral 1 indicates the housing of a timing chain tensioner, which is attached to the outer wall of an engine block 3 by bolts (not shown) inserted through holes 2 in the housing. As shown in FIG. 2, the housing is formed with a longitudinally extending a cylinder bore 4 wherein a plunger 5 having a head 5a is reciprocably disposed. The portion of the plunger in the cylinder is formed in the shape of a hollow cylinder. A coil spring 6 is placed in the hollow cylindrical portion. One end of the spring 6 is seated on the bottom of the cylinder, so that the spring-loaded plunger is biased upward as viewed in FIGS. 1 and 2.

The head 5a of the plunger has two ribs defining a groove in between, as seen in FIG. 2, which engages the inside running portion of a timing chain 7 to keep the chain from deviating sideways.

An oil passage 8 is formed in the lower part of the tensioner housing or body portion 1 and opens at its one end into the cylinder bore 4 in the vicinity of its bottom. When the housing has been installed, this passage 8 is communicated with a corresponding passage 9 of the pressure oil of the lubricating system in the engine.

Figure 3:
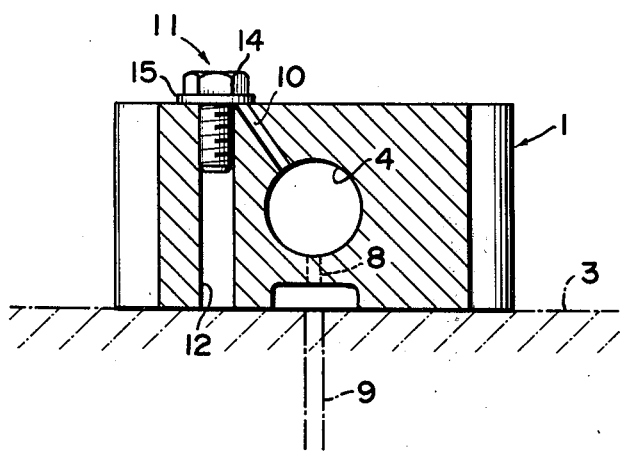
FIG. 3 is a sectional view taken on the line III—III of FIG. 2.
Figure 4:
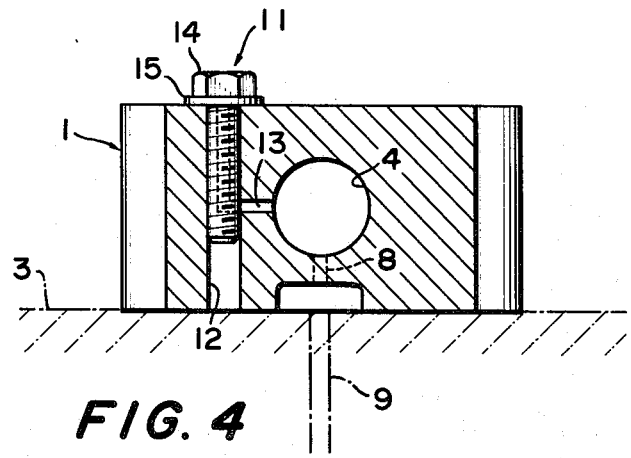
FIG. 4 is a view similar to FIG. 3 but showing another embodiment of the invention.

The housing 1 also has a connecting passage 10 for communicating the cylinder bore 4 with the atmosphere, one end of the passage 10 being opened into the bottom space of the cylinder bore 4 and the other end opened at the outside surface of the housing wall. The latter end of the passage 10 is normally closed by a closure member as indicated at 11 in FIGS. 1 and 3. The closure member 11, as shown in those figures, may take the form of a bolt, for example, screwed into a threaded hole 12 in the housing 1. In the embodiment being described, the outer end of the hole 12 is formed so close to the outer end of the passage 10 that their outer openings are closed together by the head 14 of the bolt 11. Between the bolt head and the surface of the housing there is disposed a seal washer 15 that provides a positive seal for the outer end of the passage 10.

Figure 2:
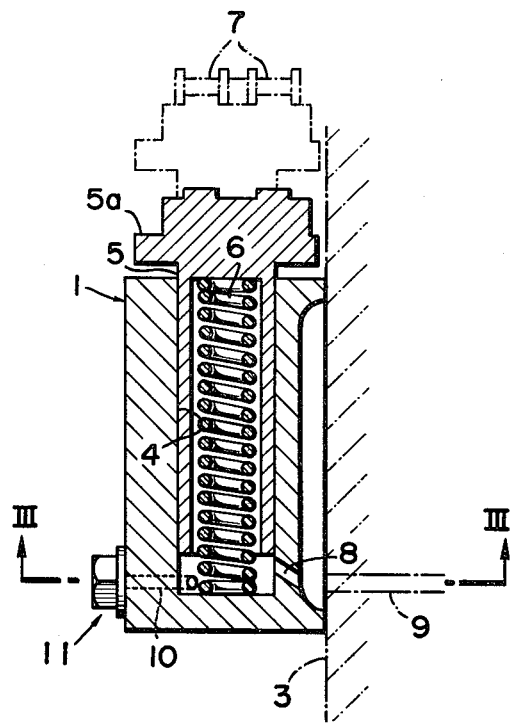
FIG. 2 is a sectional view taken on the line II—II of FIG. 1.

Preferably, the passage for the escape of air from the cylinder bore is open to the atmosphere in the front surface of the housing 1, as shown in FIG. 1, for the convenience in the works of tensioner assembling. As an alternative, the passage may open instead into the threaded hole 12 of the housing 1. In the latter case a passage 13 communicates the bottom part of the cylinder 4 with an intermediate portion of the threaded hole 12. Also, it will be understood that the closure member for the connecting passage is not limited to the bolt but may take any other shape provided it serves the closing purpose.

With the construction described, the tensioner of the invention is mounted, together with the timing chain, sprockets, and other related members, on the engine block in the manner now to be described.

First, the tensioner housing 1 is bolted or otherwise attached to the outer wall of the engine block 3. Since the housing 1 is free from the closure member 11 as well as from the plunger 6 at this time, its cylinder space is open toward the atmosphere through the connecting passage 10.

Next, the plunger 5 is placed, together with the coil spring 6, into the cylinder bore 4. As it enters the bore the plunger forces the air out of the cylinder bore via the passage 10 to the atmosphere. The venting greatly facilitates the plunger insertion.

After the plunger 5 has been disposed in the cylinder, the timing chain 7 is wound over the plunger head 5a and around a drive sprocket and a driven sprocket both of which are not shown and urges the plunger downward as viewed in FIG. 2. The passage 10, which is not covered by the closure member 11 yet, permits venting air from the cylinder to the atmosphere. This enables the chain to be easily wound around the sprockets without being imparted with excessive tension by the plunger.

Following the engagement of the timing chain 7 with the sprockets, the passage 10 is closed by the closure member 11 and the cylinder bore 4 is thereby sealed.

As has been described hereinabove, the provision of the passage in the tensioner housing and of the closure member therefor in accordance with the present invention renders it easy to insert the plunger into the cylinder bore and to wind the timing chain around the sprockets, reducing the time required for engine assembling accordingly.

What is claimed is:

1. A timing chain tensioner for an internal combustion engine comprising a tensioner housing to be attached to an outer wall of the engine block, said housing being formed with a cylinder bore therein, a plunger slidably fitted in said cylinder bore and having at its exposed end a head adapted to engage a timing chain, a spring placed in said cylinder to bias said plunger headward, said housing also having a passage therein for communicating said cylinder bore with the atmosphere, a closure member for closing said passage, and an oil passage for introducing a pressurized lubricating oil thereinto from a lubricating system in the engine.

2. A timing chain tensioner according to claim 1 in which the closure member is a bolt to be screwed into a threaded hole formed in the housing, and the passage is opened close to the outer end of the threaded hole.

3. A timing chain tensioner according to claim 1 in which the passage for communicating the cylinder bore with the atmosphere is connected to an intermediate portion of the threaded hole.

* * * * *